US012005900B2

(12) United States Patent
Goodarzi et al.

(10) Patent No.: US 12,005,900 B2
(45) Date of Patent: Jun. 11, 2024

(54) VEHICLE CONTROLLABILITY DURING TRAILER BACKUP OPERATIONS

(71) Applicant: GM GLOBAL TECHNOLOGY OPERATIONS LLC, Detroit, MI (US)

(72) Inventors: Avesta Goodarzi, Whitby (CA); Utkarsh Saini, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 17/653,942

(22) Filed: Mar. 8, 2022

(65) Prior Publication Data

US 2023/0286507 A1 Sep. 14, 2023

(51) Int. Cl.
| | |
|---|---|
| *B60W 30/00* | (2006.01) |
| *B60D 1/14* | (2006.01) |
| *B60W 30/18* | (2012.01) |
| *B60W 40/105* | (2012.01) |

(52) U.S. Cl.
CPC ......... *B60W 30/18036* (2013.01); *B60D 1/14* (2013.01); *B60W 40/105* (2013.01); *B60W 2300/14* (2013.01); *B60W 2520/10* (2013.01); *B60W 2520/22* (2013.01)

(58) Field of Classification Search
CPC ......... B60W 30/18036; B60W 40/105; B60W 2300/14; B60W 2520/10; B60W 2520/22; B60W 10/18; B60D 1/14
See application file for complete search history.

(56) References Cited

U.S. PATENT DOCUMENTS

| | | | | |
|---|---|---|---|---|
| 9,132,856 B2* | 9/2015 | Shepard | ............... | B62D 15/028 |
| 9,315,212 B1* | 4/2016 | Kyrtsos | ............. | B62D 15/0285 |
| 9,840,278 B2* | 12/2017 | Lavoie | ................... | G08G 1/168 |
| 10,933,914 B2* | 3/2021 | Dottavio | ................. | B60D 1/06 |
| 2016/0129939 A1* | 5/2016 | Singh | ................ | B62D 15/0285 |
| | | | | 701/41 |
| 2016/0257341 A1* | 9/2016 | Lavoie | ............ | B60W 30/18036 |

(Continued)

*Primary Examiner* — Phutthiwat Wongwian
*Assistant Examiner* — Sherman D Manley
(74) *Attorney, Agent, or Firm* — Lorenz & Kopf LLP (57) ABSTRACT

Systems, methods, and apparatus are provided in a vehicle to reduce the likelihood of a trailer jackknife condition. The method includes: receiving trailer profile information; receiving a dynamic vehicle steering angle ($\delta$) and dynamic hitch articulation angle ($\theta$) while the vehicle is moving in a reverse direction; continuously calculating a maximum safe vehicle speed ($v_{max}$) at which to proceed in reverse without jackknifing based on the trailer profile information, the $\delta$, the $\theta$, a predetermined safe time to jackknife (TTJ_ne), and a maximum hitch articulation angle ($\theta_{JK}$); comparing a current vehicle longitudinal speed (v) to the $v_{max}$; automatically generating a speed correction signal to cause the vehicle to slow down below the $v_{max}$ when the v exceeds the $v_{max}$; and sending the speed correction signal to a vehicle motion control system to instruct the vehicle motion control system to reduce the v below the $v_{max}$.

14 Claims, 6 Drawing Sheets

(56) References Cited

U.S. PATENT DOCUMENTS

2019/0092388 A1* 3/2019 Raad ..................... B62D 13/06
2020/0148256 A1* 5/2020 Brimmer .............. B62D 15/025
2022/0250681 A1* 8/2022 Lavoie .................. B60W 10/20

* cited by examiner

VEHICLE CONTROLLABILITY DURING TRAILER BACKUP OPERATIONS

The technical field generally relates to systems, methods, and apparatuses for improving vehicle controllability during trailer backup operations and more particularly relates to systems, methods, and apparatuses for improving vehicle controllability and reducing the likelihood of jackknife conditions during trailer backup operations.

Autonomous, semi-autonomous and conventional vehicles can be designed to accommodate the towing or trailering of various loads that include without limitation: flatbeds, enclosed trailers, cargo hoppers, campers, boats, and sometimes other motorized vehicles. Also, a multitude of different trailer hitches is used in the trailering operations such as gooseneck hitches, weight distribution hitches, pintle hitches, receiver hitches, and $5^{th}$ wheel hitches. Each configuration of trailer type and hitch type displays different vehicle dynamics.

Trailer jackknifing is a hazard that can occur when a vehicle hitched to a trailer is reversing or backing up. Often a driver is unaware the trailer may be approaching a jackknife angle when backing up. Jack-knifed trailers can cause severe damage to the rear of the vehicle, rear bumper, trailer coupler, trailer tongue, the trailer chassis, and frame to name just a few items. Vehicles towing systems may still be improved in a number of respects.

It is therefore desirable for improved methods, systems, and apparatuses for improving vehicle and trailer controllability during reverse driving operations. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicle methods and systems and related control logic for vehicle systems, methods for making and methods for operating such systems, and motor vehicles equipped with onboard control systems. By way of example, and not limitation, there are presented various embodiments that perform adaptive speed limiting and/or brake intervention during reverse driving operations to reduce the likelihood of a jackknife occurrence.

In one embodiment, a trailer backup system in a vehicle for automatically adjusting vehicle dynamics while the vehicle is hitched to a trailer to reduce the likelihood of a trailer jackknife occurring is disclosed. The trailer backup system includes a controller. The controller is configured to: receive trailer profile information; receive a dynamic vehicle steering angle ($\delta$) and dynamic hitch articulation angle ($\theta$) while the vehicle is moving in a reverse direction; continuously calculate a maximum safe vehicle speed ($v_{max}$) at which to proceed in reverse without jackknifing based on the trailer profile information, the vehicle steering angle ($\delta$), the hitch articulation angle ($\theta$), a predetermined safe time to jackknife (TTJ_ne), and a maximum hitch articulation angle ($\theta_{JK}$), wherein the safe time to jackknife (TTJ_ne) is a fixed calibratable time value that specifies a safety margin in time before a jackknife condition would be predicted to occur; compare a current vehicle longitudinal speed (v) to the maximum safe vehicle speed ($v_{max}$); automatically generate a speed correction signal to cause the vehicle to slow down below the maximum safe vehicle speed ($v_{max}$) when the current vehicle longitudinal speed (v) exceeds the maximum safe vehicle speed ($v_{max}$); and send the speed correction signal to a vehicle motion control system to instruct the vehicle motion control system to reduce the current vehicle longitudinal speed (v) below the maximum safe vehicle speed ($v_{max}$), wherein the vehicle motion control system controls appropriate vehicle actuators to reduce the current vehicle longitudinal speed (v).

In one embodiment, the trailer profile information includes a vehicle wheelbase distance (L), a vehicle's rear axle to hitch point distance (d), and a trailer rear axle distance (D), wherein the trailer rear axle distance (D) is equal to the distance between the hitch point and a trailer's rear axle when the trailer has only one axle, and for trailers with more than one axle, the trailer rear axle distance (D) is the average of the distance from the hitch point to each of the individual axles.

In one embodiment, the maximum safe vehicle speed ($v_{max}$) is determined according to the following:

$$V_{max} = \frac{L}{TTJ\_ne \cdot E} \ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

wherein, $A = \frac{L}{D}$, $B = \frac{d}{D}\tan\delta$, $C = \tan\delta$, $E = \sqrt{A^2 + B^2 - C^2}$, $\frac{d\theta}{dt} = \frac{V}{L}\left[\tan\delta\left(1 + \frac{d}{D}\cos\theta\right) + \frac{L}{D}\sin\theta\right]$, If $\frac{d\theta}{dt}$ is positive, then $\theta_{JK} = \theta_{JK}$, and If $\frac{d\theta}{dt}$ is negative, then $\theta_{JK} = -\theta_{JK}$.

In one embodiment, the controller is further configured to: calculate a time to jackknife (TTJ($\theta$)) based on the trailer profile information, the vehicle steering angle ($\delta$), the hitch articulation angle ($\theta$), and the current vehicle longitudinal speed (v); and automatically generate a brake control signal to cause the vehicle to brake to a complete stop when the time to jackknife (TTJ($\theta$)) is less than a predetermined minimum safe time to jackknife (TTJ$_{min}$), wherein TTJ($\theta$) is a predicted amount of time between a current vehicle-trailer state and a predicted jackknife state for the vehicle-trailer combination based on current vehicle-trailer motion, and wherein TTJ$_{min}$ is a calibratable value.

In one embodiment, the time to jackknife (TTJ($\theta$)) is calculated in accordance with the following:

$$TTJ(\theta) = \frac{L}{VE}\ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

wherein $A = \frac{L}{D}$, $B = \frac{d}{D}\tan\delta$, $C = \tan\delta$, and $E = \sqrt{A^2 + B^2 - C^2}$.

In another embodiment, a vehicle having a trailer backup system for automatically adjusting vehicle dynamics while the vehicle is hitched to a trailer to reduce the likelihood of a trailer jackknife condition is disclosed. The vehicle includes: a propulsion actuator, a braking actuator, a vehicle motion control system for controlling vehicle and trailer motion, and a controller. The controller is configured to: receive trailer profile information; receive a dynamic vehicle steering angle (δ) and dynamic hitch articulation angle (θ) while the vehicle is moving in a reverse direction; continuously calculate a maximum safe vehicle speed ($v_{max}$) at which to proceed in reverse without jackknifing based on the trailer profile information, the vehicle steering angle (δ), the hitch articulation angle (θ), a predetermined safe time to jackknife (TTJ_ne), and a maximum hitch articulation angle ($θ_{JK}$), wherein the safe time to jackknife (TTJ_ne) is a fixed calibratable time value that specifies a safety margin in time before a jackknife condition would be predicted to occur; compare a current vehicle longitudinal speed (v) to the maximum safe vehicle speed ($v_{max}$); automatically generate a speed correction signal to cause the vehicle to slow down below the maximum safe vehicle speed ($v_{max}$) when the current vehicle longitudinal speed (v) exceeds the maximum safe vehicle speed ($v_{max}$); and send the speed correction signal to the vehicle motion control system to instruct the vehicle motion control system to reduce the current vehicle longitudinal speed ($v_t$) below the maximum safe vehicle speed ($v_{max}$), wherein the vehicle motion control system controls the braking actuator and the propulsion actuator to reduce the current vehicle longitudinal speed (v).

In one embodiment, the trailer profile information includes a vehicle wheelbase distance (L), a vehicle's rear axle to hitch point distance (d), and a trailer rear axle distance (D), wherein the trailer rear axle distance (D) is equal to the distance between the hitch point and a trailer's rear axle when the trailer has only one axle, and for trailers with more than one axle, the trailer rear axle distance (D) is the average of the distance from the hitch point to each of the individual axles.

In one embodiment, the maximum safe vehicle speed ($v_{max}$) is determined according to the following:

$$V_{max} = \frac{L}{TTJ\_ne \cdot E} \ln\left(\left|\frac{\left[(C-B)\tan\frac{θ_{JK}}{2} + (A-E)\right]\left[(C-B)\tan\frac{θ}{2} + (A+E)\right]}{\left[(C-B)\tan\frac{θ_{JK}}{2} + (A+E)\right]\left[(C-B)\tan\frac{θ}{2} + (A-E)\right]}\right|\right),$$

wherein $A = \frac{L}{D}$, $B = \frac{d}{D}\tanδ$, $C = \tanδ$, $E = \sqrt{A^2 + B^2 - C^2}$, $\frac{dθ}{dt} = \frac{V}{L}\left[\tanδ\left(1 + \frac{d}{D}\cosθ\right) + \frac{L}{D}\sinθ\right]$, If $\frac{dθ}{dt}$ is positive, then $θ_{JK} = θ_{JK}$, and If $\frac{dθ}{dt}$ is negative, then $θ_{JK} = -θ_{JK}$.

In one embodiment, the controller is further configured to: calculate a time to jackknife (TTJ(θ)) based on the trailer profile information, the vehicle steering angle (δ), the hitch articulation angle (δ), and the current vehicle longitudinal speed (v); and automatically generate a brake control signal to cause the vehicle to brake to a complete stop when the time to jackknife (TTJ(θ)) is less than a predetermined minimum safe time to jackknife ($TTJ_{min}$), wherein TTJ(θ) is a predicted amount of time between a current vehicle-trailer state and a predicted jackknife state for the vehicle-trailer combination based on current vehicle-trailer motion, and wherein $TTJ_{min}$ is a calibratable value.

In one embodiment, the time to jackknife (TTJ(θ)) is calculated in accordance with the following:

$$TTJ(θ) = \frac{L}{VE}\ln\left(\left|\frac{\left[(C-B)\tan\frac{θ_{JK}}{2} + (A-E)\right]\left[(C-B)\tan\frac{θ}{2} + (A+E)\right]}{\left[(C-B)\tan\frac{θ_{JK}}{2} + (A+E)\right]\left[(C-B)\tan\frac{θ}{2} + (A-E)\right]}\right|\right),$$

wherein $A = \frac{L}{D}$, $B = \frac{d}{D}\tanδ$, $C = \tanδ$, and $E = \sqrt{A^2 + B^2 - C^2}$.

In another embodiment, a method in a vehicle having a trailer backup system for automatically adjusting vehicle dynamics while the vehicle is hitched to a trailer to reduce the likelihood of a trailer jackknife condition is disclosed. The method includes: receiving trailer profile information, the trailer profile information comprising a vehicle wheelbase distance (L), a vehicle's rear axle to hitch point distance (d), and a trailer rear axle distance (D); receiving a dynamic vehicle steering angle (δ) and dynamic hitch articulation angle (θ) while the vehicle is moving in a reverse direction; continuously calculating a maximum safe vehicle speed ($v_{max}$) at which to proceed in reverse without jackknifing based on the trailer profile information, the vehicle steering angle (δ), the hitch articulation angle (θ), a predetermined safe time to jackknife (TTJ_ne), and a maximum hitch articulation angle ($θ_{JK}$), wherein the safe time to jackknife (TTJ_ne) is a fixed calibratable time value that specifies a safety margin in time before a jackknife condition would be predicted to occur; comparing a current vehicle longitudinal speed (v) to the maximum safe vehicle speed ($v_{max}$); automatically generating a speed correction signal to cause the vehicle to slow down below the maximum safe vehicle speed ($v_{max}$) when the current vehicle longitudinal speed (v) exceeds the maximum safe vehicle speed ($v_{max}$); and sending the speed correction signal to a vehicle motion control system to instruct the vehicle motion control system to reduce the current vehicle longitudinal speed (v) below the maximum safe vehicle speed ($v_{max}$), wherein the vehicle motion control system controls appropriate vehicle actuators to reduce the current vehicle longitudinal speed (v).

In one embodiment, the maximum safe vehicle speed ($v_{max}$) is determined according to the following:

$$V_{max} = \frac{L}{TTJ\_ne \cdot E} \ln\left(\left|\frac{\left[(C-B)\tan\frac{θ_{JK}}{2} + (A-E)\right]\left[(C-B)\tan\frac{θ}{2} + (A+E)\right]}{\left[(C-B)\tan\frac{θ_{JK}}{2} + (A+E)\right]\left[(C-B)\tan\frac{θ}{2} + (A-E)\right]}\right|\right),$$

wherein $A = \frac{L}{D}$, $B = \frac{d}{D}\tanδ$, $C = \tanδ$, $E = \sqrt{A^2 + B^2 - C^2}$, $\frac{dθ}{dt} = \frac{V}{L}\left[\tanδ\left(1 + \frac{d}{D}\cosθ\right) + \frac{L}{D}\sinθ\right]$, If $\frac{dθ}{dt}$ is positive, then $θ_{JK} = θ_{JK}$, and If $\frac{dθ}{dt}$ is negative, then $θ_{JK} = -θ_{JK}$.

In one embodiment, the method further includes: calculating a time to jackknife (TTJ(θ)) based on the trailer profile information, the vehicle steering angle (δ), the hitch articulation angle (θ), and the current vehicle longitudinal speed (v); and automatically generating a brake control signal to cause the vehicle to brake to a complete stop when the time to jackknife (TTJ(θ)) is less than a predetermined minimum safe time to jackknife ($TTJ_{min}$), wherein the time to jackknife (TTJ(θ)) is a predicted amount of time between a current vehicle-trailer state and a predicted jackknife state for the vehicle-trailer combination based on current vehicle-trailer motion, and wherein $TTJ_{min}$ is a calibratable value.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Jackknifing during trailer backup operations is a major source of pain for vehicle drivers, especially beginners. The vehicle driver must decide between: (1) driving slower or with a smaller hitch articulation angle (HAA) to improve their safety, but simultaneously sacrificing agility and maneuverability, or (2) driving faster or with a larger HAA to improve agility and maneuverability while risking a trailer jackknife. The apparatus, systems, techniques, and articles provided herein disclose a method for providing adaptive speed adjustment during trailer backup operations to reduce the likelihood of a jackknife occurring.

Figure 1:
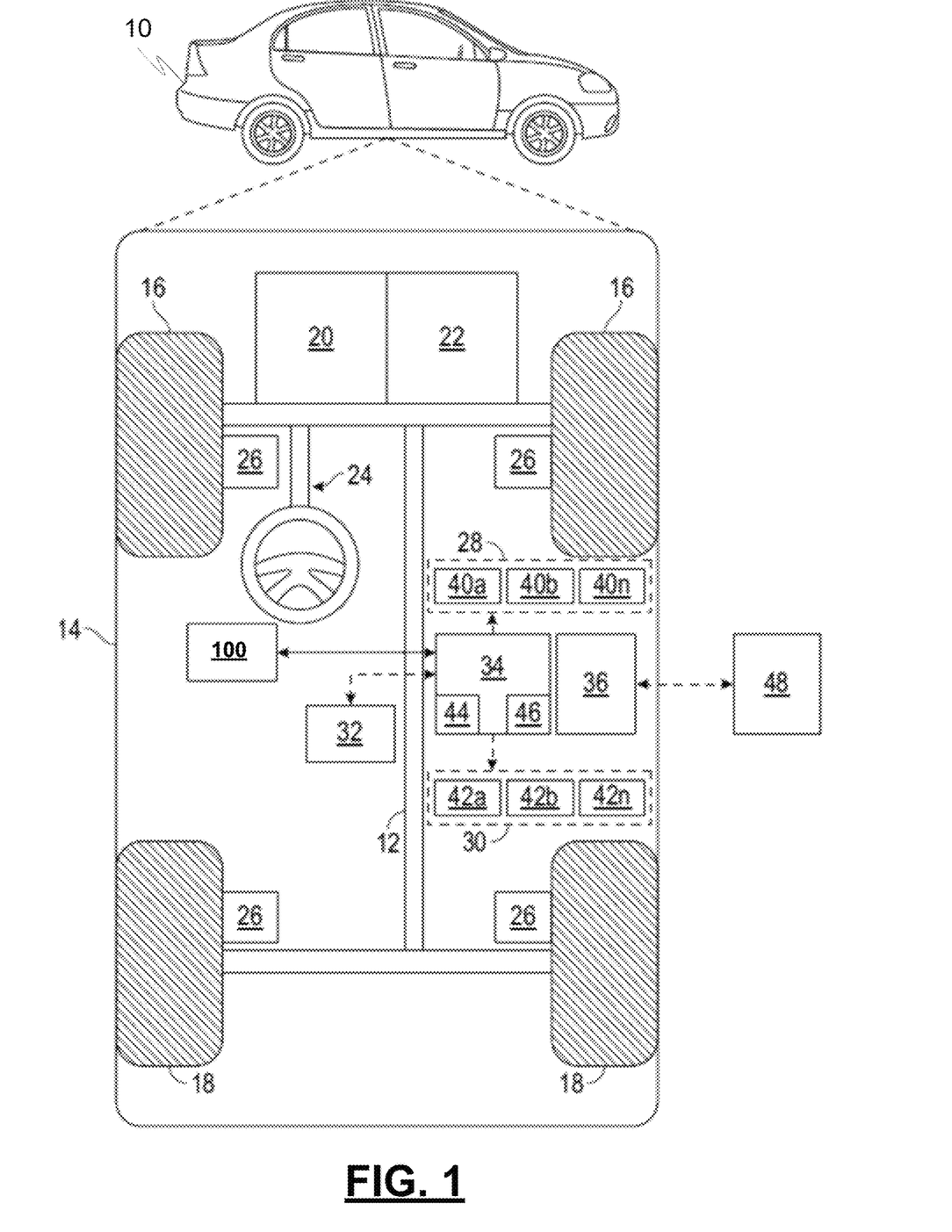
FIG. 1 is a block diagram depicting an example vehicle that includes a trailer backup system for automatically adjusting vehicle dynamics during trailer backup operations to reduce the likelihood of a trailer jackknife condition, in accordance with an embodiment.

FIG. 1 is a block diagram depicting an example vehicle 10 that includes a trailer backup system 100 for automatically adjusting vehicle dynamics during trailer backup operations to reduce the likelihood of a trailer jackknife condition. The disclosed trailer backup system 100 is configured to provide adaptive speed adjustment during trailer backup operations to reduce the likelihood of a jackknife occurring.

As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40r can include but are not limited to, radars, lidars, global positioning systems, optical cameras, thermal cameras, ultrasonic sensors (e.g., 40o-40r), inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to automatically adjust vehicle dynamics while the vehicle is hitched to a trailer to reduce the likelihood of a trailer jackknife occurring during backup operations.

The trailer backup system 100 may include any number of additional sub-modules embedded within the controller 34, which may be combined and/or further partitioned to similarly implement systems and methods described herein. Additionally, inputs to the trailer backup system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
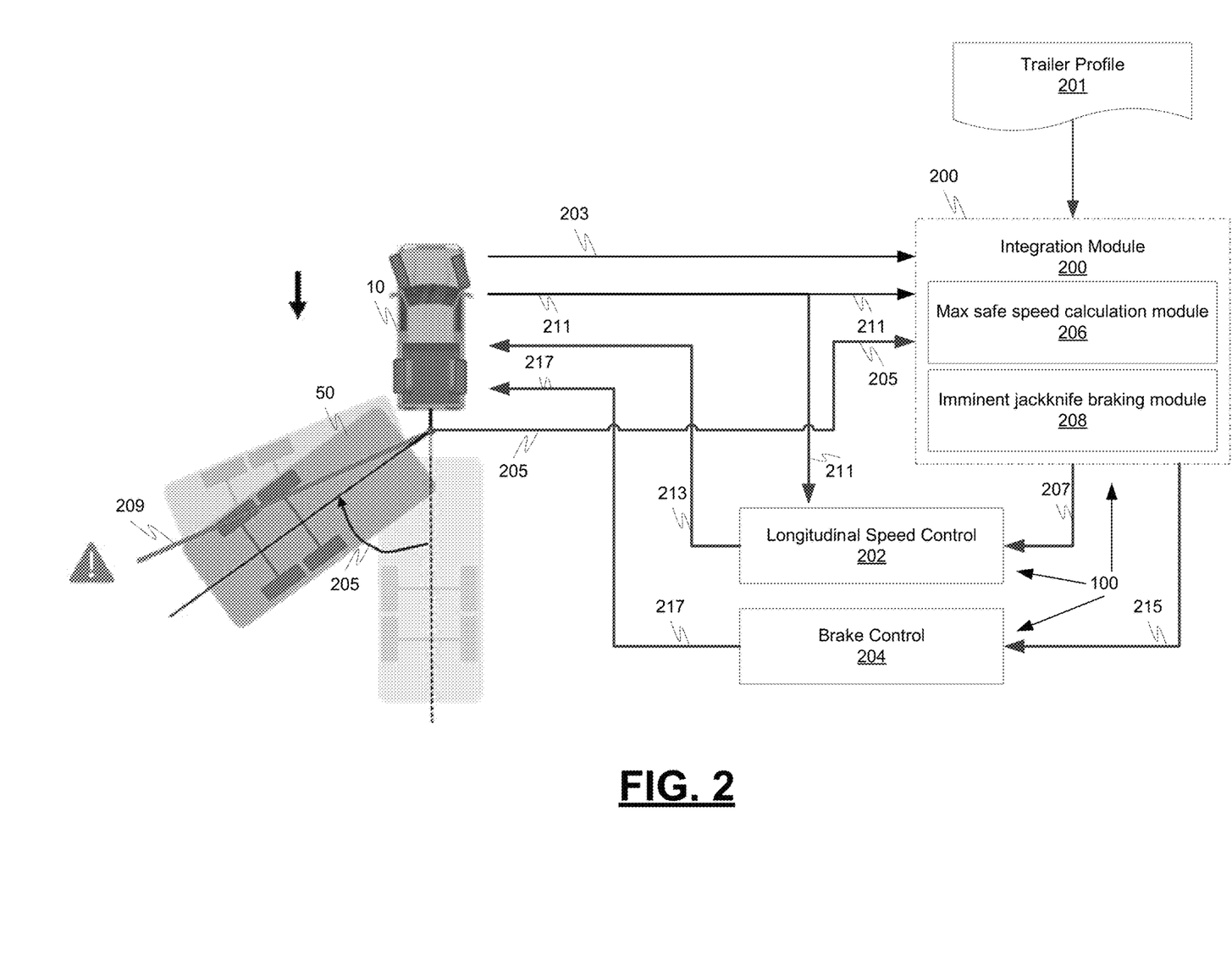
FIG. 2 is a block diagram depicting an example trailer backup system that is configured to automatically adjust vehicle dynamics while the vehicle is hitched to a trailer to reduce the likelihood of a trailer jackknife occurring during backup operations, in accordance with an embodiment.

FIG. 2 is a block diagram depicting an example trailer backup system 100 that is configured to automatically adjust vehicle dynamics while the vehicle 10 is hitched to a trailer 50 to reduce the likelihood of a trailer jackknife occurring during backup operations. The example trailer backup system 100 receives trailer profile information 201, steering angle ($\delta$) measurements 203, and corresponding HAA ($\theta$) values 205 as inputs. The example trailer backup system 100 includes an integration module 200, a longitudinal speed control module 202, and a brake control module 204. The integration module 200 includes a max safe speed calculation module 206 and an imminent jackknife braking module 208. The example integration module 200, longitudinal speed control module 202, brake control module 204, max safe speed calculation module 206, and imminent jackknife braking module 208 are implemented by one or more controller(s) 34.

The max safe speed calculation module 206 continuously calculates a maximum safe vehicle speed ($v_{max}$) 207 at which to proceed in reverse without jackknifing based on the trailer profile information 201, the steering angle ($\delta$) measurements 203, the HAA ($\theta$) values 205, a predetermined safe time to jackknife (TTJ_ne) value, and a maximum hitch articulation angle ($\theta_{JK}$) 209. The maximum hitch articulation angle ($\theta_{JK}$) 209 is the maximum angle that may occur between the vehicle and the trailer before a jackknife condition would occur. The predetermined safe time to jackknife (TTJ_ne) value is a fixed calibratable time value that specifies a safety margin in time before a jackknife condition would be predicted to occur. In some examples, the safe time to jackknife (TTJ_ne) value may be set to 4 seconds, for example. In this example, the max safe speed calculation module 206 would use this safe time to jackknife (TTJ_ne) value of 4 seconds to continuously calculate a maximum safe vehicle speed ($v_{max}$) 207 at which to proceed in reverse without jackknifing. If the vehicle were to proceed in reverse above the maximum safe vehicle speed ($v_{max}$) 207 for 4 seconds, it would be anticipated that the trailer would jackknife.

The longitudinal speed control module 202 is configured to compare a current vehicle longitudinal speed (v) 211 to the maximum safe vehicle speed ($v_{max}$) 207 and automatically generate a speed correction signal 213 to cause the vehicle to slow down below the maximum safe vehicle speed ($v_{max}$) 207 when the current vehicle longitudinal speed (v) 211 exceeds the maximum safe vehicle speed ($v_{max}$) 207. The speed correction signal 213 may be in the form of a throttle or braking torque signal sent to a vehicle motion control system or some other type of control signal. The longitudinal speed control module 202 is configured to send the speed correction signal to a vehicle motion control system to instruct the vehicle motion control system to reduce the current vehicle longitudinal speed (v) 211 below the maximum safe vehicle speed ($v_{max}$) 207. The vehicle motion control system (e.g., electronic control unit (ECU), braking actuator, propulsion actuator, and others) controls appropriate vehicle actuators to reduce the current vehicle longitudinal speed (v) 211.

Figure 3:
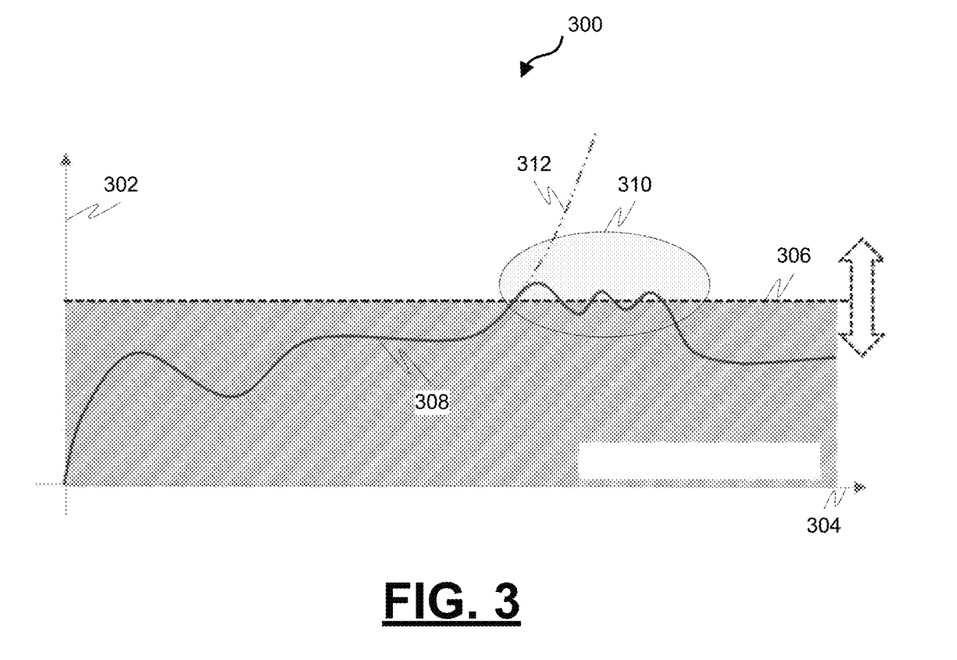
FIG. 3 is a diagram depicting a graph of example vehicle speed plotted versus time during an example operating scenario, in accordance with an embodiment.

FIG. 3 is a diagram depicting a graph 300 of example vehicle speed plotted versus time during an example operating scenario. Depicted in graph 300 are a y-axis 302 representative of speed, an x-axis 304 representative of time, a maximum safe vehicle speed 306, and a curve 308 that depicts a current vehicle speed while controlled by an example trailer backup system 100. The maximum safe vehicle speed 306 is continuously calculated by the example trailer backup system 100 and can adjust up or down depending on trailer profile information, steering angle ($\delta$) measurements 203, the HAA ($\theta$) values 205, a predetermined safe time to jackknife, and a maximum hitch articulation angle. While the current vehicle speed (represented by curve 308) remains below the maximum safe vehicle speed 306, the speed is completely under driver control. When the current vehicle speed rises above the maximum safe vehicle speed 306, the example trailer backup system 100 suppresses the current vehicle speed via throttle and/or braking actions to get the current speed below the maximum safe vehicle speed 306. The portion of time in this example scenario when the example trailer backup system 100 is actively suppressing the current vehicle speed falls within the time zone 310. At all other times, the current vehicle speed is under driver control. The curve 312, which represents speeds above the maximum safe vehicle speed 306, illustrates potential vehicle speeds that could have occurred if the example trailer backup system 100 did not automatically suppress the current vehicle speed.

Referring back to FIG. 2, the imminent jackknife braking module 208 is configured to continuously calculate a time to jackknife (TTJ(θ)) 215 based on the trailer profile information 201, steering angle (δ) measurements 203, the HAA (θ) values 205, and the current vehicle longitudinal speed (v) 211. The time to jackknife (TTJ(θ)) is a predicted amount of time between a current vehicle-trailer state and a predicted jackknife state for the vehicle-trailer combination based on current vehicle-trailer motion.

The brake control module 204, is configured to compare the calculated time to jackknife (TTJ(θ)) 215 to a predetermined minimum safe time to jackknife (TTJ$_{min}$). The brake control module 204, based on the calculated time to jackknife (TTJ(θ)) 215, is configured to automatically generate a brake control signal 217 to cause the vehicle 10 to brake to a complete stop when the time to jackknife (TTJ(θ)) 215 is less than the predetermined minimum safe time to jackknife (TTJ$_{min}$). The predetermined minimum safe time to jackknife (TTJ$_{min}$) includes a safety margin, e.g., 1 second to allow some recovery time to prevent a jackknife.

The brake control signal 217 may be in the form of a braking torque signal sent to a vehicle motion control system or some other type of control signal. The brake control module 204 is configured to send the brake control signal 217 to a vehicle motion control system to instruct the vehicle motion control system to come to a complete stop. The vehicle motion control system (e.g., electronic control unit (ECU), braking actuator, and others) controls appropriate vehicle actuators to cause the vehicle 10 to come to a complete stop.

Figure 4:
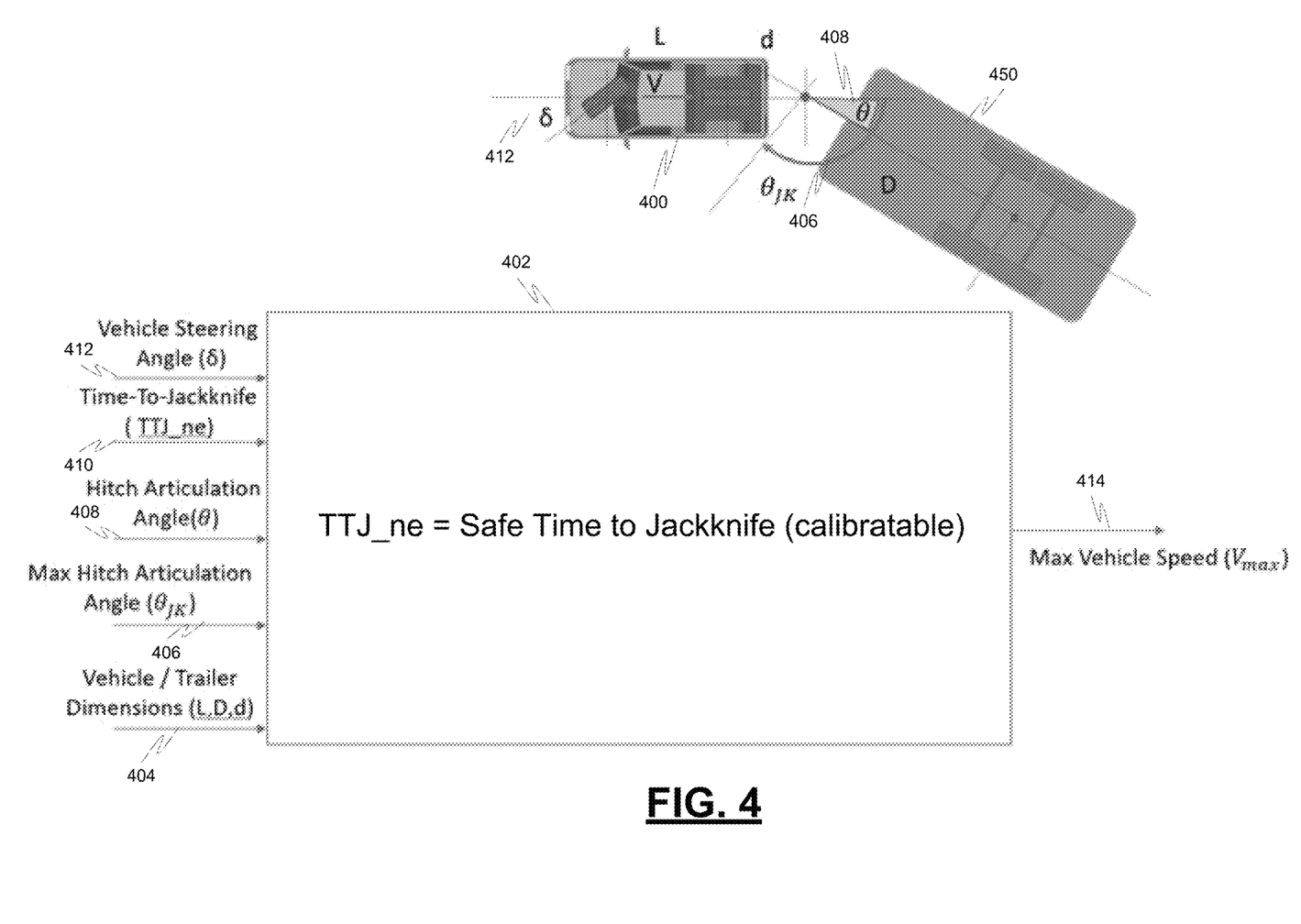
FIG. 4 is a block diagram depicting an example max safe speed calculation module in a vehicle hitched to a trailer, in accordance with an embodiment.

FIG. 4 is a block diagram depicting an example max safe speed calculation module 402 in a vehicle 400 hitched to a trailer 450. The example max safe speed calculation module 402 is configured to receive trailer profile information 404, a maximum hitch articulation angle (θ$_{JK}$) 406, the HAA (θ) 408, a predetermined safe time to jackknife (TTJ_ne) value 410, and the steering angle (δ) 412. Based on these inputs, the example max safe speed calculation module 402 is configured to calculate a maximum safe vehicle speed (v$_{max}$) 414.

The trailer profile information 404 comprises a vehicle wheelbase distance (L), a vehicle's rear axle to hitch point distance (d), and a trailer rear axle distance (D). The trailer rear axle distance (D) is equal to the distance between the hitch point and the trailer's rear axle when the trailer has only one axle. For trailers that have more than one axle (e.g., trailer shown in FIG. 4), the trailer rear axle distance (D) is the average of the distance from the hitch point to each of the individual axles. The maximum safe vehicle speed (v$_{max}$) 414 in this example is calculated in accordance with the following equations:

$$V_{max} = \frac{L}{TTJ\_ne \cdot E} \ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

wherein, $A = \frac{L}{D}$, $B = \frac{d}{D}\tan\delta$, $C = \tan\delta$, $E = \sqrt{A^2+B^2-C^2}$, $$\frac{d\theta}{dt} = \frac{V}{L}\left[\tan\delta\left(1+\frac{d}{D}\cos\theta\right)+\frac{L}{D}\sin\theta\right],$$

If $\frac{d\theta}{dt}$ is positive, then $\theta_{JK} = \theta_{JK}$, and If $\frac{d\theta}{dt}$ is negative, then $\theta_{JK} = -\theta_{JK}$.

Figure 5:
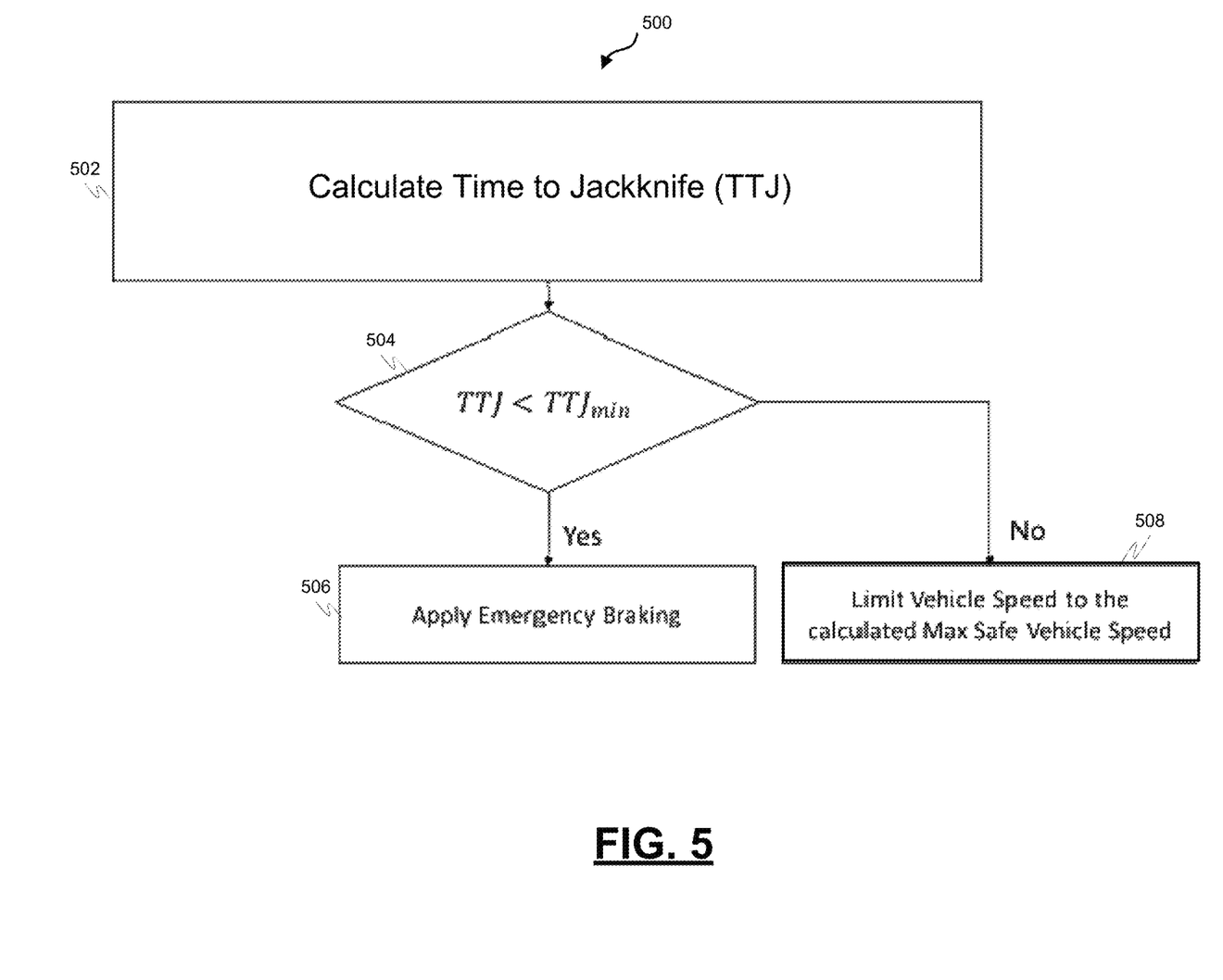
FIG. 5 is flow chart depicting an example process for determining actions taken by a trailer backup system when a maximum safe vehicle speed ($v_{max}$) is exceeded, in accordance with an embodiment.

FIG. 5 is flow chart depicting an example process 500 for determining actions taken by a trailer backup system.

The example process 500 includes calculating a time to jackknife (TTJ(θ)) (operation 502). The time to jackknife (TTJ(θ)) is a predicted amount of time between a current vehicle-trailer state and a predicted jackknife state for the vehicle-trailer combination based on current vehicle-trailer motion. The time to jackknife (TTJ(θ) in this example is calculated in accordance with the following equations:

$$TTJ(\theta) = \frac{L}{VE}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

wherein L is a vehicle wheelbase distance, d is a vehicle's rear axle to hitch point distance, D is a trailer rear axle distance, wherein the trailer rear axle distance (D) is equal to the distance between the hitch point and a trailer's rear axle when the trailer has only one axle, and for trailers with more than one axle, the trailer rear axle distance (D) is the average of the distance from the hitch point to each of the individual axles, $$A = \frac{L}{D}, B = \frac{d}{D}\tan\delta, C = \tan\delta, \text{ and } E = \sqrt{A^2+B^2-C^2}.$$

The example process 500 includes determining if the calculated time to jackknife (TTJ(θ)) is less than a predetermined minimum safe time to jackknife (TTJ$_{min}$) (decision 504). If the calculated time to jackknife (TTJ(θ)) is less than a predetermined minimum safe time to jackknife (TTJ$_{min}$) (yes at decision 504), then the example process 500 includes applying emergency braking (operation 506). Braking operations may be performed by a brake control module such as brake control module 204.

If the calculated time to jackknife (TTJ(θ)) is not less than the predetermined minimum safe time to jackknife (TTJ$_{min}$) (no at decision 504), then the example process 500 includes limiting vehicle speed to the calculated maximum safe vehicle speed (v$_{max}$) (operation 508). Limiting operations may be performed by a longitudinal speed control module such as longitudinal speed control module 202.

Figure 6:
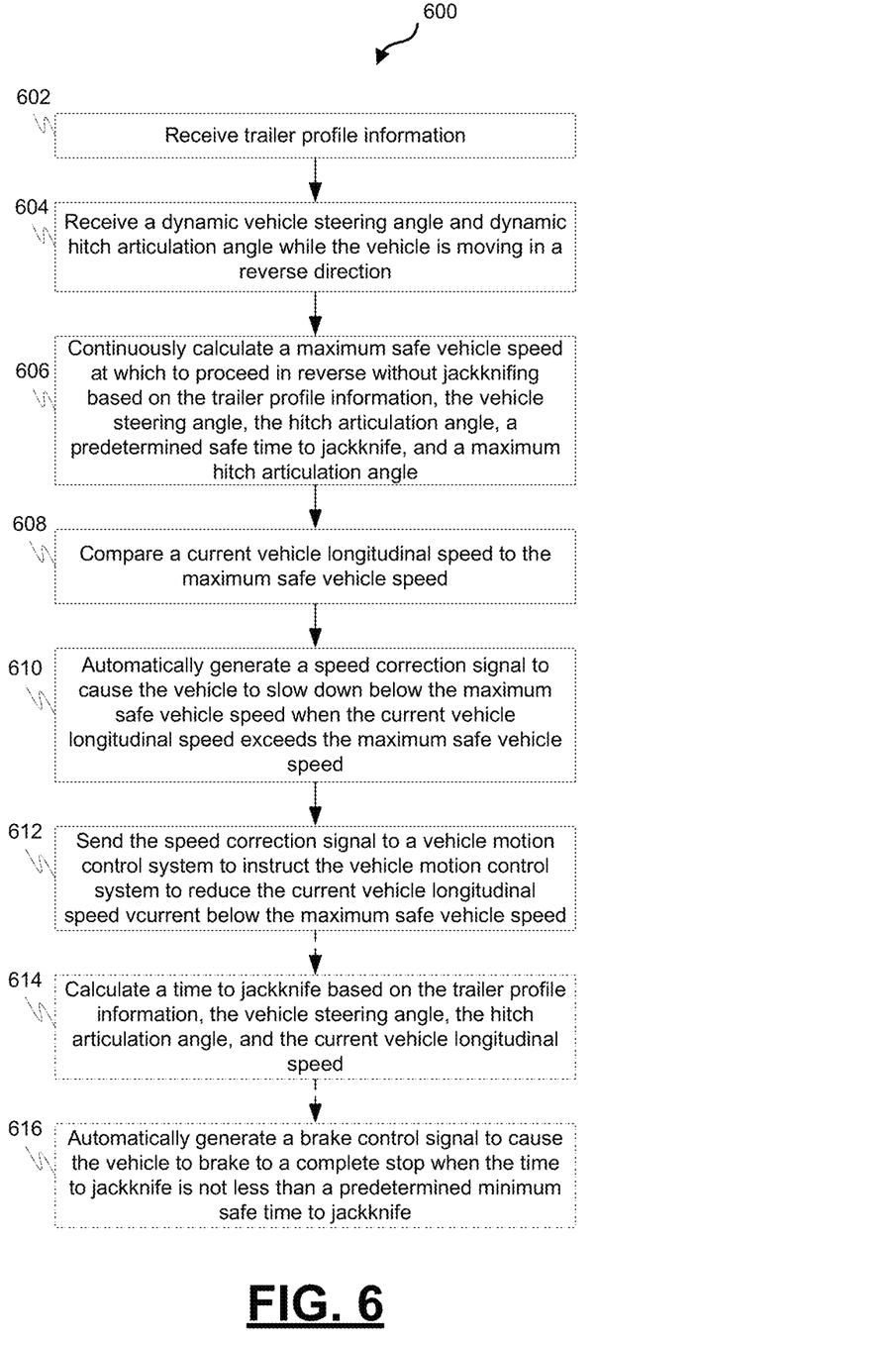
FIG. 6 is a process flow chart depicting an example process in a vehicle having a trailer backup system for automatically adjusting vehicle dynamics while the vehicle is hitched to a trailer to reduce the likelihood of a trailer jackknife condition, in accordance with an embodiment.

FIG. 6 is a process flow chart depicting an example process 600 in a vehicle having a trailer backup system for automatically adjusting vehicle dynamics while the vehicle is hitched to a trailer to reduce the likelihood of a trailer jackknife condition. The order of operation within process 600 is not limited to the sequential execution as illustrated in the FIG. 6 but may be performed in one or more varying orders as applicable and in accordance with the present disclosure.

The example process 600 includes receiving trailer profile information (operation 602) and includes receiving a dynamic vehicle steering angle (δ) and dynamic hitch articulation angle (θ) while the vehicle is moving in a reverse direction (operation 604). The trailer profile information may include a vehicle wheelbase distance (L), a vehicle's rear axle to hitch point distance (d), and a trailer rear axle distance (D), wherein the trailer rear axle distance (D) is equal to the distance between the hitch point and a trailer's rear axle when the trailer has only one axle, and for trailers with more than one axle, the trailer rear axle distance (D) is the average of the distance from the hitch point to each of the individual axles.

The example process 600 includes continuously calculating a maximum safe vehicle speed ($v_{max}$) at which to proceed in reverse without jackknifing based on the trailer profile information, the vehicle steering angle ($\delta$), the hitch articulation angle ($\theta$), a predetermined safe time to jackknife (TTJ_ne), and a maximum hitch articulation angle ($\theta_{JK}$) (operation 606). The predetermined safe time to jackknife (TTJ_ne) is a calibratable time value that specifies a safety margin in time before a jackknife condition would be predicted to occur based on the trailer profile information, the maximum safe vehicle speed ($v_{max}$), the vehicle steering angle ($\delta$), and the hitch articulation angle ($\theta$).

The maximum safe vehicle speed ($v_{max}$) may be calculated according to the following equations:

$$V_{max} = \frac{L}{TTJ\_ne \cdot E} \ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$\text{wherein } A = \frac{L}{D}, B = \frac{d}{D}\tan\delta, C = \tan\delta, E = \sqrt{A^2+B^2-C^2},$$

$$\frac{d\theta}{dt} = \frac{V}{L}\left[\tan\delta\left(1+\frac{d}{D}\cos\theta\right)+\frac{L}{D}\sin\theta\right],$$

If $\frac{d\theta}{dt}$ is positive, then $\theta_{JK} = \theta_{JK}$, and If $\frac{d\theta}{dt}$ is negative, then $\theta_{JK} = -\theta_{JK}$.

The example process 600 includes comparing a current vehicle longitudinal speed (v) to the maximum safe vehicle speed ($v_{max}$) (operation 608), automatically generating a speed correction signal to cause the vehicle to slow down below the maximum safe vehicle speed $v_{max}$ when the current vehicle longitudinal speed V exceeds the maximum safe vehicle speed $v_{max}$ (operation 610), and sending the speed correction signal to a vehicle motion control system to instruct the vehicle motion control system to reduce the current vehicle longitudinal speed v below the maximum safe vehicle speed $v_{max}$ (operation 612).

The example process 600 may optionally include calculating a time to jackknife (TTJ($\theta$)) based on the trailer profile information, the $\delta$, the $\theta$, and the v (operation 614) and automatically generating a brake control signal to cause the vehicle to brake to a complete stop when the TTJ($\theta$) is less than a predetermined minimum safe time to jackknife (TTJ$_{min}$) (operation 616).

The time to jackknife (TTJ($\theta$)) may be calculated using the following equation:

$$TTJ(\theta) = \frac{L}{VE}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$\text{wherein } A = \frac{L}{D}, B = \frac{d}{D}\tan\delta, C = \tan\delta, \text{ and } E = \sqrt{A^2+B^2-C^2}.$$

The apparatus, systems, techniques, and articles provided herein disclose a method for providing adaptive speed adjustment during trailer backup operations to reduce the likelihood of a jackknife occurring. The apparatus, systems, techniques, and articles provided herein disclose a method for vehicle speed limiting during trailer backup up to a safe speed. The apparatus, systems, techniques, and articles provided herein disclose a method for adaptive vehicle speed limiting based on driver steering angle, hitch articulation angle, and trailer dimensions. The apparatus, systems, techniques, and articles provided herein disclose an integrated algorithm to manage speed limiting and jackknife imminent braking as required.

The apparatus, systems, techniques, and articles provided herein disclose an algorithm and method for calculating an adaptive maximum safe vehicle speed during trailer backup based on trailer dimensions, current hitch articulation angle, maximum hitch articulation angle, and vehicle steering angle to prevent vehicle-trailer jackknife and maximize maneuverability. The maximum safe speed is calculated to be higher for longer trailers and/or smaller hitch articulation angles, and lower for shorter trailers and/or larger hitch articulation angle. Also, the maximum safe speed is regulated based on the driver steering angle to ensure adequate time to jackknife.

The apparatus, systems, techniques, and articles provided herein disclose an algorithm and method for advisory speed/brake control to limit the vehicle speed up the calculated maximum safe vehicle speed and bring vehicle to a stop in case of imminent jackknife, as determined by the maximum hitch articulation angle. Below the maximum safe vehicle speed, as determined by the algorithm, the driver has full control of vehicle speed.

The apparatus, systems, techniques, and articles provided herein can provide improved customer satisfaction during trailer backup through: improved safety, improved maneuverability, and improved driver convenience.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A trailer backup system in a vehicle for automatically adjusting vehicle dynamics while the vehicle is hitched to a trailer to reduce a likelihood of a trailer jackknife occurring, the trailer backup system comprising a controller, the controller configured to:
receive trailer profile information, wherein the trailer profile information comprises a vehicle wheelbase distance (L), a vehicle's rear axle to hitch point distance (d), and a trailer rear axle distance (D);
receive a dynamic vehicle steering angle ($\delta$) and dynamic hitch articulation angle ($\theta$) while the vehicle is moving in a reverse direction;
continuously calculate a maximum safe vehicle speed ($v_{max}$) at which to proceed in reverse without jackknifing based on the trailer profile information, the $\delta$, the $\theta$, a predetermined safe time to jackknife (TTJ_ne), and a maximum hitch articulation angle ($\theta_{JK}$), wherein the TTJ_ne is a calibratable time value that specifies a safety margin in time before a jackknife condition would be predicted to occur;

wherein:

$$V_{max} = \frac{L}{TTJ\_ne \cdot E} \ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right)$$

$$A = \frac{L}{D}, B = \frac{d}{D}\tan\delta, C = \tan\delta, E = \sqrt{A^2 + B^2 - C^2},$$

$$\frac{d\theta}{dt} = \frac{V}{L}\left[\tan\delta\left(1 + \frac{d}{D}\cos\theta\right) + \frac{L}{D}\sin\theta\right],$$

If $d\theta/dt$ is positive, then $\theta_{JK} = \theta_{JK}$, and If $d\theta/dt$ negative, then $\theta_{JK} = -\theta_{JK}$;

compare a current vehicle longitudinal speed (v) to the $v_{max}$;

automatically generate a speed correction signal to cause the vehicle to slow down below the $v_{max}$ when the v exceeds the $v_{max}$; and send the speed correction signal to a vehicle motion control system to instruct the vehicle motion control system to reduce the v below the $v_{max}$, wherein the vehicle motion control system controls appropriate vehicle actuators to reduce the v.

2. The trailer backup system of claim 1, wherein the controller is further configured to:

calculate a time to jackknife (TTJ($\theta$)) based on the trailer profile information, the $\delta$, the $\theta$, and the v; and automatically generate a brake control signal to cause the vehicle to brake to a complete stop when the TTJ($\theta$) is less than a predetermined minimum safe time to jackknife (TTJ$_{min}$), wherein TTJ$_{min}$ is a calibratable value.

3. The trailer backup system of claim 2, wherein:

$$TTJ(\theta) = \frac{L}{VE}\ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

$$A = \frac{L}{D}, B = \frac{d}{D}\tan\delta, C = \tan\delta, \text{ and } E = \sqrt{A^2 + B^2 - C^2}.$$

4. The trailer backup system of claim 1, wherein the controller is further configured to:

calculate a time to jackknife (TTJ($\theta$)) based on the trailer profile information, the $\delta$, the $\theta$, and the v; and automatically generate a brake control signal to cause the vehicle to brake to a complete stop when the TTJ($\theta$) is less than a predetermined minimum safe time to jackknife (TTJ$_{min}$), wherein TTJ$_{min}$ is a calibratable value.

5. The trailer backup system of claim 4, wherein:

$$TTJ(\theta) = \frac{L}{VE}\ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

$$A = \frac{L}{D}, B = \frac{d}{D}\tan\delta, C = \tan\delta, \text{ and } E = \sqrt{A^2 + B^2 - C^2}.$$

6. A vehicle having a trailer backup system for automatically adjusting vehicle dynamics while the vehicle is hitched to a trailer to reduce a likelihood of a trailer jackknife condition, the vehicle comprising:

a propulsion actuator;

a braking actuator;

a vehicle motion control system for controlling vehicle and trailer motion; and a controller configured to:

receive trailer profile information, wherein the trailer profile information comprises a vehicle wheelbase distance (L), a vehicle's rear axle to hitch point distance (d), and a trailer rear axle distance (D);

receive a dynamic vehicle steering angle ($\delta$) and dynamic hitch articulation angle ($\theta$) while the vehicle is moving in a reverse direction;

continuously calculate a maximum safe vehicle speed ($v_{max}$) at which to proceed in reverse without jackknifing based on the trailer profile information, the $\delta$, the $\theta$, a predetermined safe time to jackknife (TTJ_ne), and a maximum hitch articulation angle ($\theta_{JK}$), wherein the TTJ_ne is a calibratable time value that specifies a safety margin in time before a jackknife condition would be predicted to occur; compare a current vehicle longitudinal speed (v) to the $v_{max}$;

automatically generate a speed correction signal to cause the vehicle to slow down below the $v_{max}$ when the v exceeds the $v_{max}$;

send the speed correction signal to the vehicle motion control system to instruct the vehicle motion control system to reduce the v below the $v_{max}$, wherein the vehicle motion control system controls the braking actuator and the propulsion actuator to reduce the v;

calculate a time to jackknife (TTJ($\theta$)) based on the trailer profile information, the $\delta$, the $\theta$, and the v; and automatically generate a brake control signal to cause the vehicle to brake to a complete stop when the TTJ($\theta$) is less than a predetermined minimum safe time to jackknife (TTJ$_{min}$), wherein TTJ$_{min}$ is a calibratable value, wherein $$TTJ(\theta) = \frac{L}{VE}\ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

$$A = \frac{L}{D}, B = \frac{d}{D}\tan\delta, C = \tan\delta, \text{ and } E = \sqrt{A^2 + B^2 - C^2}.$$

7. The vehicle of claim 6, wherein:

$$V_{max} = \frac{L}{TTJ\_ne \cdot E}\ln\left(\left|\frac{\left[(C-B)\tan\frac{\theta_{JK}}{2} + (A-E)\right]\left[(C-B)\tan\frac{\theta}{2} + (A+E)\right]}{\left[(C-B)\tan\frac{\theta_{JK}}{2} + (A+E)\right]\left[(C-B)\tan\frac{\theta}{2} + (A-E)\right]}\right|\right),$$

$$A = \frac{L}{D}, B = \frac{d}{D}\tan\delta, C = \tan\delta, E = \sqrt{A^2 + B^2 - C^2},$$

$$\frac{d\theta}{dt} = \frac{V}{L}\left[\tan\delta\left(1 + \frac{d}{D}\cos\theta\right) + \frac{L}{D}\sin\theta\right],$$

If $\frac{d\theta}{dt}$ is positive, then $\theta_{JK} = \theta_{JK}$, and If $\frac{d\theta}{dt}$ is negative, then $\theta_{JK} = -\theta_{JK}$.

8. The vehicle of claim 7 wherein the controller is further configured to:
calculate a time to jackknife (TTJ(θ)) based on the trailer profile information, the δ, the θ, and the v; and
automatically generate a brake control signal to cause the vehicle to brake to a complete stop when the TTJ(θ) is less than a predetermined minimum safe time to jackknife (TTJ$_{min}$), wherein TTJ$_{min}$ is a calibratable value.

9. The vehicle of claim 8, wherein:

$$TTJ(\theta) = \frac{L}{VE}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$A = \frac{L}{D}, B = \frac{d}{D}\tan\delta, C = \tan\delta, \text{ and } E = \sqrt{A^2+B^2-C^2}.$$

10. A method in a vehicle having a trailer backup system for automatically adjusting vehicle dynamics while the vehicle is hitched to a trailer to reduce a likelihood of a trailer jackknife condition, the method comprising:
receiving trailer profile information, the trailer profile information comprising a vehicle wheelbase distance (L), a vehicle's rear axle to hitch point distance (d), and a trailer rear axle distance (D);
receiving a dynamic vehicle steering angle (δ) and dynamic hitch articulation angle (θ) while the vehicle is moving in a reverse direction;
continuously calculating a maximum safe vehicle speed v$_{max}$) at which to proceed in reverse without jackknifing based on the trailer profile information, the δ, the θ, a predetermined safe time to jackknife (TTJ_ne), and a maximum hitch articulation angle (θ$_{JK}$), wherein the TTJ_ne is a calibratable time value that specifies a safety margin in time before a jackknife condition would be predicted to occur;
wherein:

$$V_{max} = \frac{L}{TTJ\_ne \cdot E}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$A = \frac{L}{D}, B = \frac{d}{D}\tan\delta, C = \tan\delta, E = \sqrt{A^2+B^2-C^2},$$

$$\frac{d\theta}{dt} = \frac{V}{L}\left[\tan\delta\left(1+\frac{d}{D}\cos\theta\right)+\frac{L}{D}\sin\theta\right],$$

If $\frac{d\theta}{dt}$ is positive, then $\theta_{JK} = \theta_{JK}$, and If $\frac{d\theta}{dt}$ is negative, then $\theta_{JK} = -\theta_{JK}$.

comparing a current vehicle longitudinal speed (V) to the v$_{max}$;
automatically generating a speed correction signal to cause the vehicle to slow down below the v$_{max}$ when the v exceeds the v$_{max}$; and
sending the speed correction signal to a vehicle motion control system to instruct the vehicle motion control system to reduce the v below the v$_{max}$, wherein the vehicle motion control system controls appropriate vehicle actuators to reduce the v.

11. The method of claim 10, further comprising:
calculating a time to jackknife (TTJ(θ)) based on the trailer profile information, the δ, the θ, and the v; and
automatically generating a brake control signal to cause the vehicle to brake to a complete stop when the TTJ(θ) is less than a predetermined minimum safe time to jackknife (TTJ$_{min}$), wherein TTJ$_{min}$ is a calibratable value.

12. The method of claim 11, wherein:

$$TTJ(\theta) = \frac{L}{VE}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$A = \frac{L}{D}, B = \frac{d}{D}\tan\delta, C = \tan\delta, \text{ and } E = \sqrt{A^2+B^2-C^2}.$$

13. The method of claim 10, further comprising:
calculating a time to jackknife (TTJ(θ)) based on the trailer profile information, the δ, the θ, and the v; and
automatically generating a brake control signal to cause the vehicle to brake to a complete stop when the TTJ(θ) is less than a predetermined minimum safe time to jackknife (TTJ$_{min}$), wherein TTJ$_{min}$ is a calibratable value.

14. The method of claim 13, wherein:

$$TTJ(\theta) = \frac{L}{VE}\ln\left(\left|\frac{\left[(C-B)\tan\frac{\theta_{JK}}{2}+(A-E)\right]\left[(C-B)\tan\frac{\theta}{2}+(A+E)\right]}{\left[(C-B)\tan\frac{\theta_{JK}}{2}+(A+E)\right]\left[(C-B)\tan\frac{\theta}{2}+(A-E)\right]}\right|\right),$$

$$A = \frac{L}{D}, B = \frac{D}{D}\text{TAN}\delta, C = \text{TAN}\delta, \text{ AND } E = \sqrt{A^2+B^2-C^2}.$$

* * * * *